July 27, 1937.  W. W. SLOANE  2,088,351
SHAKER CONVEYER
Filed June 2, 1934  2 Sheets-Sheet 1
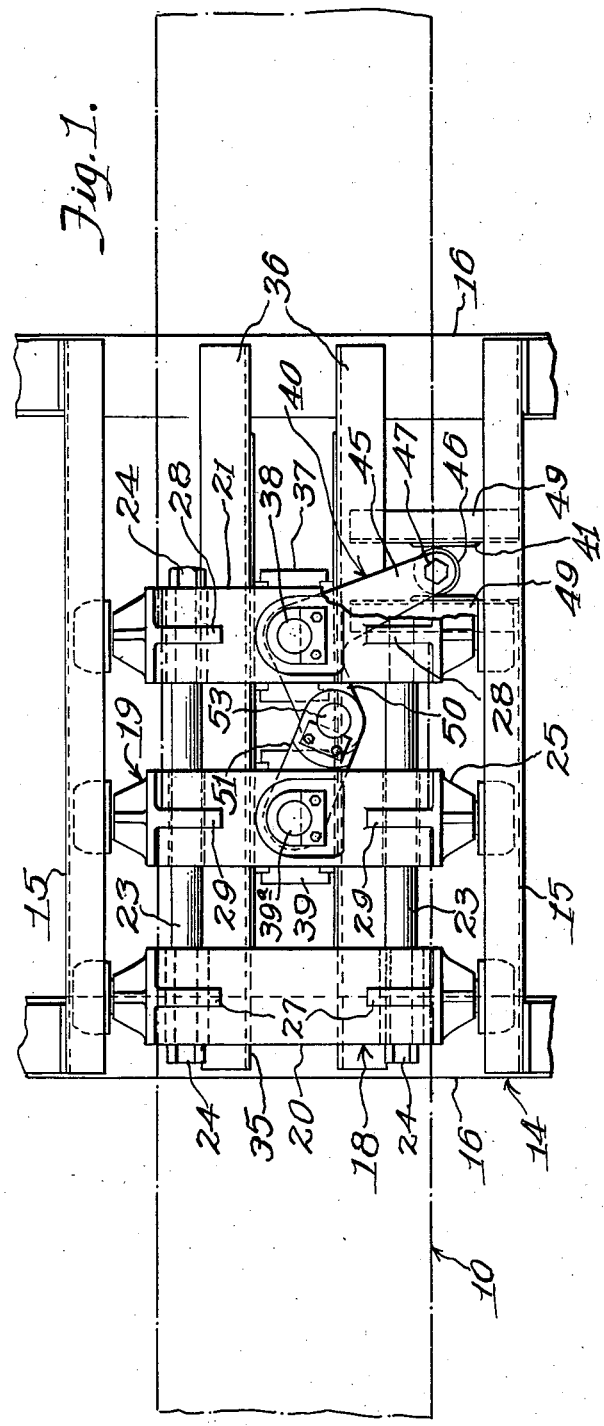
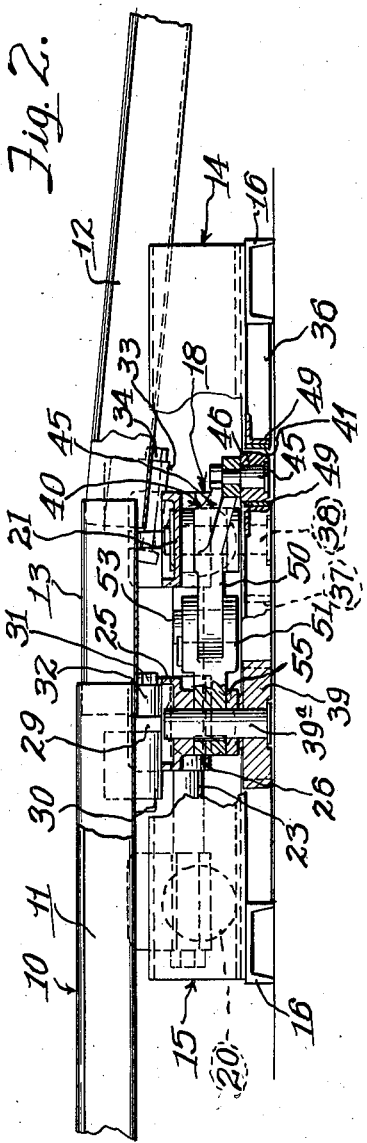
Inventor
William W. Sloane
Clarence F. Poole
Attorney July 27, 1937. W. W. SLOANE 2,088,351
SHAKER CONVEYER
Filed June 2, 1934 2 Sheets-Sheet 2
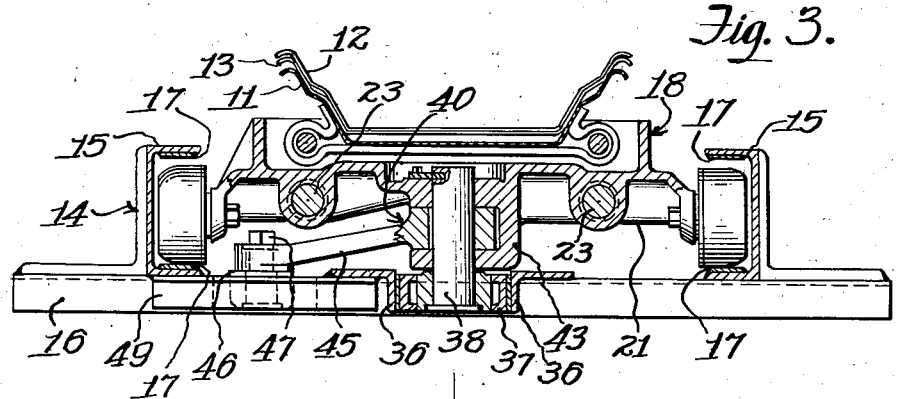
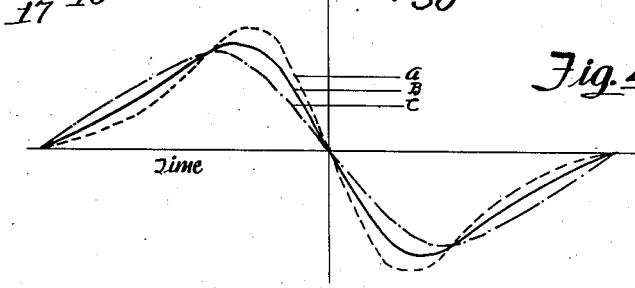
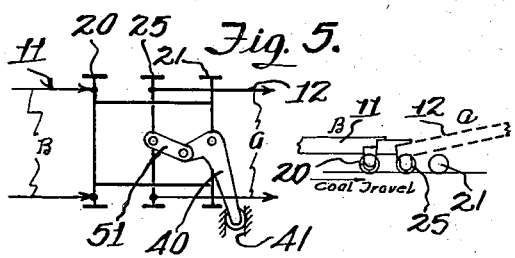
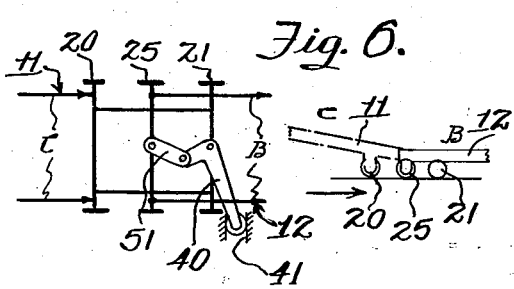
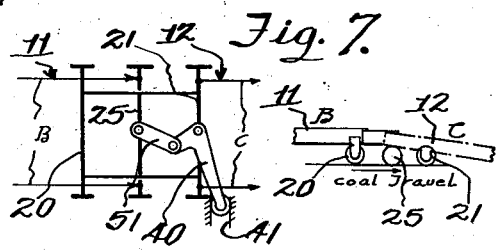
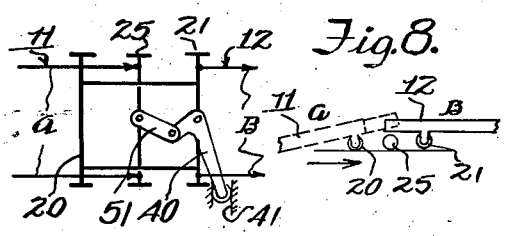
Inventor
William W. Sloane
Clarence F. Poole
Attorney Patented July 27, 1937

2,088,351

UNITED STATES PATENT OFFICE 2,088,351

SHAKER CONVEYER

William W. Sloane, Chicago, Ill., assignor to Goodman Manufacturing Company, Chicago, Ill., a corporation of Illinois Application June 2, 1934, Serial No. 728,682

13 Claims. (Cl. 198—220)

This invention relates to improvements in shaker conveyers and has as its principal object to provide a power transmitting device for interchangeably connecting adjacent portions of a conveyer pan or trough line in such a manner that the violence of the drive motion of the driven section of the pan line may be different than that of the driving section.

My invention may be more clearly understood by reference to the accompanying drawings wherein:

Figure 1 is a detail plan view of one embodiment of my invention with certain parts broken away;

Figure 2 is a side elevation of the embodiment of my invention illustrated in Figure 1, showing the trough sections of the shaker conveyer pan line connected thereto and showing certain parts broken away and in section;

Figure 3 is an enlarged transverse sectional view of the embodiment of my invention illustrated in Figure 1;

Figure 4 is a diagrammatical view showing several hypothetical velocity curves of the device of my invention; and Figures 5, 6, 7, and 8 are diagrammatical views illustrating various arrangements of portions of the pan line with respect to each other for effecting drives of different character to the driven portion of the pan line.

Referring now in particular to the embodiment of my invention illustrated in the drawings, the connecting device is shown as applied to a shaker conveyer trough or pan line 10, including a trough section 11 and a trough section 12. Said trough sections illustrate any adjacent trough sections of a shaker conveyer pan line which are to be driven at different violences relative to each other, to compensate for varying grades in the pan line, as will hereinafter more fully appear.

The connecting device is mounted on a suitable base 14 adapted to be held in fixed relation with respect to the mine bottom by means of jacks, or the like, in a usual manner. Said base, as herein shown, comprises a pair of inwardly facing channel members 15, 15 supported adjacent their ends on suitable cross-members 16, 16 adapted to rest on and be held in fixed relation with respect to the mine bottom in the aforementioned manner.

The insides of the flanges of said channel members are provided with suitable wearing strips 17, 17 which provide a track for three transverse trough supporting members 20, 21 and 25, all of which members have suitable antifriction roller devices secured to their opposite ends for riding in said channel members.

The two outermost transverse supporting members 20 and 21 are connected together in parallel-spaced relation by means of a pair of connecting rods 23, 23 to form a single carrier unit 18 for one of the conveyer troughs 11 or 12. Said connecting rods have shouldered portions abutting the inner faces of said transverse members and hold said members in fixed relation with respect to each other by means of suitable nuts 24, 24 threaded on their outer ends.

The intermediate transverse member 25 forms an independent carrier unit 19 for either of the conveyer troughs 11 or 12 and has eyes 26, 26 through which the connecting rods 23, 23 extend to permit reciprocable movement of said intermediate member between the adjacent supporting members 20 and 21.

The conveyer troughs 11 and 12 may be interchangeably connected to any one of said transverse supporting members by means of transversely disposed apertured flanges 27, 27 and 28, 28 extending upwardly from opposite sides of the supporting members 20 and 21, respectively, or by means of similar apertured flanges 29, 29 extending upwardly from opposite sides of the transverse supporting member 25. As, for example, the trough section 11 is provided with depending laterally extending eyes 30, 30 adapted to have connecting bolts 31, 31 pass therethrough to register for optional engagement with the apertured flanges 27, 27 or 29, 29. Said connecting bolts are also adapted to register for engagement with suitable eyes 32, 32 depending from and extending outwardly from a trough section 13 which bridges the gap between the trough sections 11 and 12. In a like manner, the conveyer trough 12 is provided with depending laterally extending eyes 33, 33 adapted to be optionally connected to either of the apertured flanges 28, 28 or 29, 29 by means of suitable connecting bolts 34, 34 in the usual manner. The apertures in the flanges 27, 27, 28, 28 and 29, 29 are relatively large to permit angular movement of all of said troughs with respect to their respective supporting members in a vertical plane.

It will be observed, of course, that the conveyer troughs 11 and 12 may also be connected to the end members 20 and 21 of the carrier unit 18, but this arrangement serves no useful purpose, because said trough sections will then merely reciprocate in unison with each other.

Suitable means are provided for holding said carrier devices and troughs in alignment with respect to each other upon reciprocation thereof, which include a guide 35 extending longitudinally along the center of the base 14. Said guide is formed from the insides of the vertical legs of parallel-spaced angles 36, 36 secured adjacent their ends to the cross-members 16, 16. A guide shoe 37 is carried on the lower end of a shaft 38 secured to and depending from the supporting member 21 and its sides are adapted to engage the longitudinal guide 35. A similar guide shoe 39 depends from the transverse supporting member 25 and its sides slidably engage said guide. The last-named guide shoe is carried on the lower end of a shaft 39a secured to and depending from the supporting member 25.

Referring now in particular to the details of the drive connection between the carrier devices 18 and 19, forming my invention, the driving power to the driven carrier unit is transmitted through a rocking device, such as a bell crank member 40, which reacts against a stationary guide or cam 41 held from movement with respect to the mine bottom. Said bell crank member is carried in a yoke 43 depending from and formed integral with the transverse supporting member 21 and is loosely mounted on the vertical shaft 38 for pivotal movement with respect thereto.

One lever arm 45 of said bell crank member extends laterally and angularly from the shaft 38 in a direction generally away from each of said carrier units and has a roller 46 depending therefrom and carried by a depending shouldered shaft 47. Said roller is adapted to engage the stationary guide or cam 41. Said guide extends transversely of the line of travel of the pan line and is formed by a pair of parallel-spaced angles 49, 49 connected between the one channel 15 and one angle 36. It is thus apparent that reciprocable movement of the carrier member 18 will cause the roller 46 to react against the stationary guide 41 which will rock said bell crank member about the axis of the vertical shaft 38.

Another lever arm 50 of said bell crank member extends in a general rearward direction towards the transverse member 25 and is pivotally connected adjacent its end to a link 51 by means of a pivotal pin 53. The opposite end of said link is carried in a yoke 55 depending from and formed integral with the transverse supporting member 25 and is loosely mounted on the vertical shaft 39a.

It will be seen from the foregoing that reciprocable movement of the carrier unit 18 will reciprocably move the intermediate transverse support member 25 by means of the bell crank member 40 which bell crank member is actuated by reciprocable movement of said carrier as the roller 46 reacts against the stationary guide 41. As herein shown, the center of the pin 53 rocks to equal sides of a line intersecting the centers of the shafts 38 and 39a and the length of stroke of the carrier member 25 is the same as the length of stroke of the carrier member 18, but the drive motion of said carrier member is different due to the different displacements of said carrier members with respect to each other during the stroke which is caused by the interposition of said bell crank member and link between said carriers actuated by the stationary cam or guide 41.

Thus, when one trough is connected to the carrier unit 18 and the other trough is connected to the carrier unit 19 and the trough connected to said first-named carrier unit is driven by the usual shaker conveyer drive mechanism, a conveying effect is imparted to the second trough which is more violent than the conveying effect of the first trough. Such an arrangement is suitable where the first trough is conveying material along the level, and the second trough is inclined upwardly with respect to the first trough.

With reference now to Figures 4 to 8, inclusive, diagrammatically illustrating the various connections between different sections of the pan line, and the velocity curves of said sections when connected in several relationships with respect to each other, the velocity curves indicated by reference characters A, B and C in Figure 4, illustrate effective motions for conveying coal along the level or up or down an incline.

When one portion of the pan line is along the level, and the second portion of the pan line is inclined upwardly with respect thereto, as shown in Figure 5, it is desirable that the conveying effect of the inclined portion of the pan line be more violent than the conveying effect of the level portion of said pan line in order that the coal travel along the entire pan line be substantially the same. Therefore, if it is assumed that the left hand trough section 11, shown in Figure 5, is connected to the carrier member 18 and driven by a motion of the type illustrated by curve B in Figure 4 and the inclined portion 12 of the pan line is connected to the carrier unit 19, the latter carrier is reciprocably driven by said first carrier unit through the bell crank member 40 reacting against the stationary cam 41, hereinbefore described, but the motion of the right hand trough section will be more violent than that of the first trough section, and similar to the motion represented by curve A in Figure 4, with the result that the coal travel along the inclined portion of the pan line is substantially the same as along the level portion of the pan line. Thus, the pan line may be driven by a relatively moderate drive motion and the flow of material therealong will be relatively constant, and the maximum stresses on the drive mechanism may be kept to a predetermined safe value.

In Figure 6, the first portion of the pan line is inclined so as to convey material downwardly therealong, and the second portion of the pan line is shown as being substantially level. When such a condition arises, it is desirable that the conveying effect of the first portion of the pan line be less violent than that of the second portion of the pan line. Such a drive may be effected by reciprocably driving the carrier unit through the trough 12 at a motion similar to that illustrated by curve B. The carrier unit 18 is thus reciprocably driven by the carrier unit 19 through the link 51 and bell crank member 40 reacting against the stationary cam 41 in the hereinbefore-described manner. With such an arrangement, the conveying effect imparted to the trough 11 will be similar to that indicated by curve C in Figure 4 and will consequently be less violent than that of the trough 12 and sufficient to move coal down the trough 11 into the trough 12 and along said trough at the same velocity it moves down said first-named trough.

In Figure 7 an arrangement is illustrated in which the trough 11 is on the level while the trough 12 is inclined downwardly with respect thereto. In order that the conveying effect of the trough 12 may be less violent than the conveying effect of the trough 11, said last-named trough is connected to the carrier unit 19 for reciprocably driving said carrier unit, while the trough 12 is connected to the carrier unit 18 and is driven therefrom at a motion having less violence than the motion of the trough 11 for moving coal along said troughs at a relatively constant speed.

Likewise in Figure 8, the trough 12 is shown as being connected to the carrier unit 18 and driven by a motion similar to that indicated by curve B in Figure 4, while the trough 11 is connected to the carrier unit 19 and driven therefrom at a motion similar to that indicated by curve A in said figure. Thus, the conveying effect of the inclined trough is greater than that of the level trough so that material may be moved upwardly along said inclined trough and be discharged onto and moved along said level trough at a constant speed of travel.

It will be seen from the foregoing that a number of troughs or sections of a pan line may be arranged in several ways with respect to each other to conform to varying grades; that these troughs may be driven from a single drive mechanism; and that the flow of material therealong may be substantially constant regardless of whether it is moving up or down grade or along the level; and that one or more of such power transmitting devices may readily be inserted in the pan line at any points where a change in shaking effort is required. The arrangement is such that the change in driving motion is effected by a simple system of links and levers actuated by movement of the driving trough through a cam and roller device of a simplified construction.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. In a shaker conveyer, a conveyer pan line including two conveyer troughs, and a connection between said troughs whereby one trough may be driven from the other and the violence of the motion of the driven trough may be changed comprising a rectilinearly movable support for one of said troughs, a rocking device pivoted thereon and movable therewith, a guide stationary with respect to said troughs and disposed transversely thereof, a connection between said rocking device and guide for rocking said rocking device upon reciprocable movement of said rectilinearly movable support, and an operative connection between said rocking device and second trough for driving said second trough.

2. In combination with a shaker conveyer, a conveyer pan line including two conveyer troughs, and means for connecting said troughs together in such a manner that one trough may be driven from the other and the motion of the driven trough may be changed comprising a rectilinearly movable support for one of said troughs, a rocking device pivoted thereon and movable therewith, a stationary horizontal guide, a lever arm extending from said rocking device having engagement with said guide for rocking said rocking device upon reciprocable movement of said shaker conveyer, and another lever arm extending from said rocking device having driving engagement with said driven trough.

3. In combination with a shaker conveyer, a conveyer pan line including two conveyer troughs, and means for connecting said troughs together in such a manner that one trough may be driven from the other and the motion of the driven trough may be changed comprising a bell crank member movable with one of said troughs, a stationary guide extending transversely of said trough, a connection from one lever arm of said bell crank member to said guide, and a driving connection between the other lever arm of said bell crank member and said driven trough.

4. In combination with a shaker conveyer, a conveyer pan line including a pair of conveyer troughs, and means for connecting said troughs together in such a manner that one trough may be driven from the other and the motion of the driven trough may be changed comprising a wheeled carrier support for one of said troughs, a rocking device pivoted to said carrier support, a horizontal rectilinear guide adapted to be held in fixed relation with respect to the ground, a lever arm extending from said rocking device and having engagement with said guide for rocking said rocking device upon reciprocable movement of said pan line, and another lever arm extending from said rocking device having driving engagement with said driven trough.

5. In combination with a shaker conveyer, a conveyer pan line including two conveyer troughs, and means for connecting said troughs together in such a manner that one trough may be driven from the other and the motion of the driven trough may be of a different violence than the motion of the driving trough comprising a wheeled carrier support for one of said troughs, a rocking device pivotally mounted thereon, a stationary rectilinear cam, a lever arm extending from said rocking device and having a rider member thereon engageable with said cam for rocking said rocking device upon reciprocable movement of said conveyer pan line, and another lever arm extending from said rocking device having driving engagement with said driven trough.

6. In combination with a shaker conveyer, a conveyer pan line including a pair of conveyer troughs, and means for connecting said troughs together in such a manner that one trough may be driven from the other and the motion of the driven trough may be changed comprising a bell crank member movable about an axis movable with one of said troughs, a stationary guide cam extending transversely of the line of travel of said conveyer troughs, an operative connection from one lever arm of said bell crank member to said guide cam for pivotally moving said bell crank member upon reciprocable movement of said conveyer troughs and an operative connection from the other lever arm of said bell crank member to said driven conveyer trough for driving said trough.

7. In combination with a shaker conveyer, a conveyer pan line including a pair of conveyer troughs, and means for connecting said troughs together in such a manner that one trough may be driven from the other and the motion of the driven trough may be changed comprising a bell crank member movable about an axis movable with one of said troughs, a rectilinear stationary guide cam extending transversely of the line of travel of said conveyer troughs and offset from the pivotal axis of said bell crank member, a connection between one lever arm of said bell crank member and said guide cam for pivotally moving said bell crank member upon reciprocable movement of said conveyer troughs, and an operative connection from said bell crank member to said driven conveyer trough for driving said trough.

8. In a shaker conveyer, a conveyer pan line including a pair of conveyer troughs adapted to be inclined at various angular relations with respect to each other, a rectilinearly movable carrier for supporting an end of one of said troughs, a rectilinearly movable carrier for an adjacent end of the other of said troughs, and a connection between said carriers whereby one of said carriers may be reciprocably driven from the other and the violence of the motion of the driven carrier may be changed comprising a rocking device pivoted to one of said carriers for bodily movement therewith, a stationary guide, a connection between said guide and rocking device for rocking said rocking device upon reciprocable movement of said carrier supports and an operative connection between said rocking device and said other carrier.

9. In a shaker conveyer, a conveyer pan line including a pair of conveyer troughs adapted to be inclined at various angular relations with respect to each other, a carrier for one of said troughs, a carrier for another of said troughs, and a connection between said carriers whereby one of said carriers may be reciprocably driven from the other and the violence of the motion of the driven carrier may be changed comprising a rocking device pivoted to one of said carriers, a guide extending transversely of the line of travel of said carriers, a connection between said guide and rocking device for rocking said rocking device upon reciprocable movement of said carrier, and an operative connection between said rocking device and said other carrier.

10. In a shaker conveyer, a conveyer pan line including a pair of conveyer troughs adapted to be inclined at various angular relations with respect to each other in a vertical plane, a carrier for one of said troughs, a carrier for another of said troughs, and a connection between said carriers whereby one of said carriers may be reciprocably driven from the other and the violence of the motion of the driven carrier may be changed comprising a bell crank member pivoted to one of said carriers, a rectilinear cam, a connection between one lever arm of said bell crank member and cam for rocking said bell crank member upon reciprocable movement of said carrier, and an operative connection between the other lever arm of said bell crank member and said other carrier.

11. In a shaker conveyer, a conveyer pan line including a pair of conveyer troughs adapted to be inclined at various angular relations with respect to each other, a rectilinear guide frame, a wheeled carrier support guided in said frame and adapted to form a support for one of said troughs, another wheeled carrier support guided in said frame and adapted to form a support for said other trough, and a connection between said carriers whereby one of said carriers may be reciprocably driven from the other and the violence of the motion of the driven carrier may be changed comprising a rocking device pivoted to one of said carriers, a stationary guide, a connection between said guide and rocking device for rocking said rocking device upon reciprocable movement thereof, and an operative connection between said rocking device and said other carrier.

12. In a shaker conveyer, a conveyer pan line including a pair of conveyer troughs adapted to be inclined at various angular relations with respect to each other in a vertical plane, a base, a wheeled carrier support movable along said base and forming a support for an end of one of said troughs, another wheeled carrier support movable along said base and forming a support for an adjacent end of the other of said troughs, and a connection between said carriers whereby one of said carriers may be reciprocably driven from the other and the violence of the motion of the driven carrier may be changed, comprising a bell crank member pivoted to one of said carriers, a stationary cam on said base and extending transversely of the path of travel of said carriers, a connection between one lever arm of said bell crank member and said cam for rocking said bell crank member upon reciprocable movement of its associated carrier, and an operative connection between the other lever arm of said bell crank member and said other carrier.

13. In a shaker conveyer, a conveyer pan line including a pair of conveyer troughs, a base, a wheeled carrier support movable along said base and forming a support for an end of one of said troughs, another wheeled carrier support movable along said base and forming a support for an adjacent end of the other of said troughs, and a connection between said carriers whereby one of said carriers may be reciprocably driven from the other and the violence of the motion of the driven carrier may be changed, comprising a bell crank member pivoted to one of said carriers, a rectilinear cam on said base extending transversely of the path of travel of said carriers and adapted to be held in fixed relation with respect thereto, a connection between one lever arm of said bell crank member and said cam for rocking said bell crank member upon reciprocable movement of its associated carrier, and an operative connection between the other lever arm of said bell crank member and said other carrier.

WILLIAM W. SLOANE.